United States Patent [19]

Takahama et al.

[11] 4,149,794
[45] * Apr. 17, 1979

[54] MOTOR-DRIVEN SHUTTER MECHANISM

[75] Inventors: Sho Takahama, Takarazuka; Hiroshi Shimizu, Matsubara; Seijiro Kushibe, Nishinomiya, all of Japan

[73] Assignee: Fuji Photo Film Co., Ltd., Minami-ashigara, Japan

[*] Notice: The portion of the term of this patent subsequent to Oct. 17, 1995, has been disclaimed.

[21] Appl. No.: 725,815

[22] Filed: Sep. 23, 1976

[30] Foreign Application Priority Data

Jan. 31, 1976 [JP] Japan .................................. 51/10716

[51] Int. Cl.² ......................... G03B 7/08; G03B 9/40
[52] U.S. Cl. ................................. 354/23 D; 354/234; 354/237; 354/29
[58] Field of Search ........................ 354/26–30, 354/38, 43, 44, 230, 234, 235, 246, 247; 355/71; 318/499, 63, 290, 293, 88

[56] References Cited

U.S. PATENT DOCUMENTS

| | | | |
|---|---|---|---|
| 3,348,462 | 10/1967 | Fahlenberg | 354/234 |
| 3,468,228 | 9/1969 | Rogers | 354/38 |
| 3,750,543 | 8/1973 | Eloranta et al. | 354/27 |
| 3,882,522 | 5/1975 | Erlichman | 354/30 |
| 3,942,183 | 3/1976 | Whiteside | 354/29 |
| 3,987,473 | 10/1976 | Kondo | 354/234 |
| 4,009,866 | 3/1977 | Iwata et al. | 354/29 |
| 4,016,574 | 4/1977 | Iwata et al. | 354/29 |

Primary Examiner—L. T. Hix
Assistant Examiner—William B. Perkey
Attorney, Agent, or Firm—Sughrue, Rothwell, Mion, Zinn and Macpeak

[57] ABSTRACT

A motor-driven shutter mechanism comprising two shutter members adapted to open and close an exposure aperture for the passage of the incoming light therethrough. These shutter members are operatively coupled to each other and to the drive shafts of two motors through a motion translator for translating a rotary motion into a linear movement. Electric drive circuits for operating the motors are also disclosed.

7 Claims, 10 Drawing Figures

MOTOR-DRIVEN SHUTTER MECHANISM

BACKGROUND OF THE INVENTION

The present invention relates to a motor-driven shutter mechanism for use in an optical image producing apparatus, such as a photographic camera or a copying machine, of a type which necessitates a shutter mechanism for selectively opening and closing an exposure aperture provided in the apparatus for the passage of the incoming light therethrough.

A shutter mechanism utilizing an electromagnetic control system, that is, a so-called electromagnetically operated shutter mechanism, is well known in the art. This conventional electromagnetically operated shutter mechanism merely gives a maximum shutter speed of not more than 1/30 second due to the fact that less technical consideration has been paid to the design of electromagnetic coils, the type of electromagnets and/or the way they are used. Moreover, since the electromagnetic coils employed in the conventional shutter mechanism are bulky, the overall design of the shutter mechanism is accordingly bulky. When it comes to a photographic camera in which the shutter mechanism is to be employed, there have been some problems to be solved.

Furthermore, although the conventional shutter mechanism utilizing the electromagnetic control system is simple in construction and durable in performance, it has not yet been put into practice, because of the bulky size and unavailability of the high maximum shutter speed.

SUMMARY OF THE INVENTION

Accordingly, the present invention has been developed to provide an improved shutter mechanism which substantially solves the problems heretofore encountered and which comprises two shutter members, each of which is supported for movement between an inoperative position, in which an exposure aperture for the passage of the incoming light therethrough is closed, and an operated position in which the exposure aperture is opened to allow the passage of the incoming light therethrough, and two electrically operated reversible motors each having a drive shaft operatively connected to the shutter mechanism. The reversible motors are of a type having at least one armature winding.

An electric drive circuit is also disclosed for operating the reversible motors, which drive circuit is capable of generating opening and closing pulses at different times spaced at a predetermined interval. With the opening pulse applied to the armature winding of one motor, its drive shaft is rotated in one direction to move the shutter member from the inoperative position towards the operated position; with the closing pulse applied to the armature winding of the other motor, its drive shaft is rotated in the opposite direction to move the shutter members, which have been moved towards the operated position, back towards the inoperative position.

In one preferred embodiment of the present invention, the shutter mechanism utilizing two electrically operated motors and two shutter members respectively operatively coupled to said motors is disclosed. So far as the illustrated embodiment of the present invention is involved, the opening and closing pulses may be applied to the motors, respectively.

BRIEF DESCRIPTION OF THE DRAWING

For a better understanding of the present invention, the present invention will now be described in conjunction with preferred embodiments thereof with reference to the accompanying drawings, in which.

DETAILED DESCRIPTION OF THE INVENTION

Figure 1:
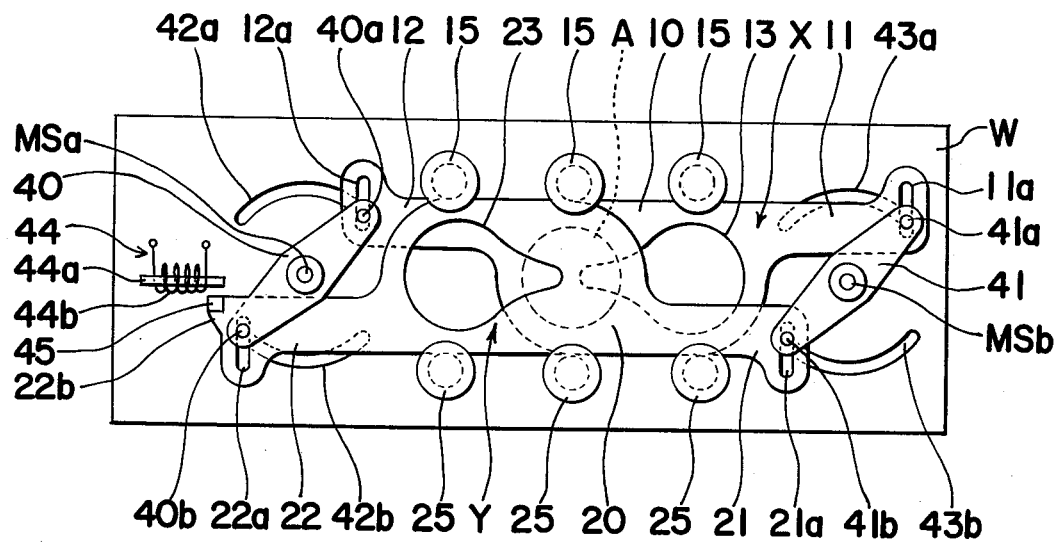
FIG. 1 is a schematic front elevational view of a motor-driven shutter mechanism according to one preferred embodiment of the present invention, the shutter mechanism being shown in a closed position.

Before the description of the present invention proceeds, it is to be noted that like parts are designated by like reference numerals throughout the accompanying drawings. It is also to be noted that, for the sake of ready and better understanding of the present invention, the present invention will be described as applied to a shutter mechanism of the guillotine type used in a photographic camera. However, the concept of the present invention is equally applicable not only to a camera shutter mechanism, but also to a shutter mechanism utilized in business machines such as copying machines for preparing microfiches.

Figure 2:
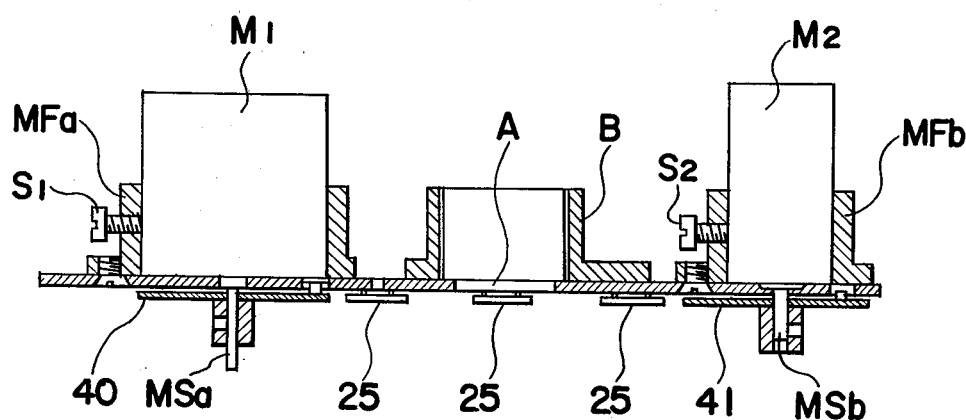
FIG. 2 is a top sectional view of the shutter mechanism shown in FIG. 1.
Figure 3:
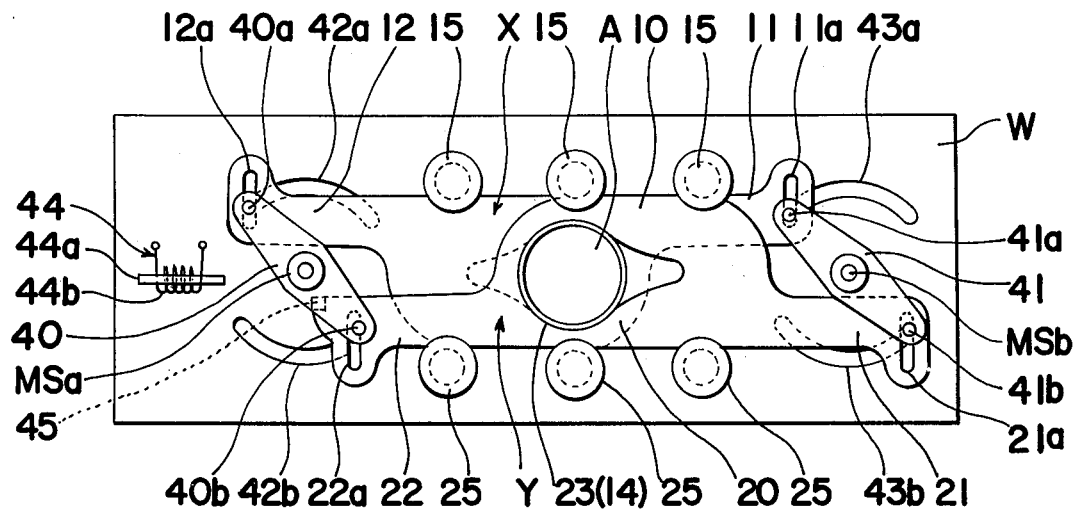
FIG. 3 is a view similar to FIG. 1, showing the shutter mechanism in an opened position.

Referring first to FIGS. 1 to 3, a shutter mechanism according to one preferred embodiment of the present invention is shown to comprise first and second shutter members X and Y operatively carried by a camera housing (not shown) in a manner as will be described later, a portion of which camera housing is shown by W in the form of a wall panel. It is, however, to be understood that the camera housing has an exposure aperture, shown by the broken line A and defined in the wall panel W, which exposure aperture is positioned in alignment with the optical axis of an objective lens assembly (not shown) mounted on a lens barrel that is rigidly or interchangeably connected to the camera housing in any known manner.

As best shown in FIG. 2, the wall panel W is shown to have a substantially cyindrical barrel B rigidly flanged to one surface thereof in alignment with the exposure aperture A for guiding the incoming light, which has been passed through the first and second shutter members X and Y in the manner as will be described later, towards a photosensitive medium such as a photosensitive film positioned adjacent one end of the barrel B remote from the exposure aperture A. This wall panel W also has a pair of spaced mounting flanges MFa and MFb shown to be of different diameter and rigidly secured to said one surface of the wall panel W at respective lateral sides of the barrel B. The mounting flanges MFa and MFb are employed to support electric motors $M_1$ and $M_2$, respectively, by means of set screws $S_1$ and $S_2$ with respective drive shafts MSa and MSb of the motors $M_1$ and $M_2$ rotatably extending through the wall panel W.

The first shutter member X is shown to be comprised of a first shutter plate 10 of a shape having a pair of arms 11 and 12 outwardly extending in the opposite directions from the respective ends of the first shutter plate 10. Respective free ends of the first shutter plate 10 have slots 11a and 12a defined therein, each of said slots 11a and 12a extending at right angles to the longitudinal axis of the corresponding arm 11 or 12 and also to the direction of movement of the shutter member X. The shutter plate 10 has an opening 13 defined therein.

The second shutter member Y is similar in construction to the first shutter member X and is shown to be comprised of a first shutter plate 20 of a shape having a pair of arms 21 and 22 outwardly extending in the opposite directions from the respective ends of the first shutter plate 20. Respective free ends of the second shutter plate 20 have slots 21a and 22a extending at right angles to the longitudinal axis of the corresponding arm 21 or 22 and also to the direction of movement of any one of the first and second shutter members X and Y. The shutter plate 20 has an opening 23 defined therein.

These first and second shutter members X and Y are supported by the wall panel W by means of two rows of substantially equally spaced mounting pin members 15 and 25 all tapped into the wall panel W and so shaped as to guide the relative parallel movement of the first and second shutter members X and Y in the opposite directions with respect to each other without allowing any one of the first and second shutter members X and Y to separate from the wall panel W.

Mounted on the drive shafts MSa and MSb for rotation together with said drive shafts MSa and MSb, respectively, are connecting levers 40 and 41. The connecting lever 40 has one end operatively connected to the shutter member X by means of a pin member 40a which extends from that end of the connecting lever 40 and is slidingly engaged in the slot 12a in the shutter member X. The other end of the connecting lever 40 is also operatively connected to the second shutter member Y by means of a similar pin member 40b which extends from that end of the connecting lever 40 and is slidingly engaged in the slot 22a in the second shutter member Y.

On the other hand, the connecting lever 41 has one end operatively connected to the first shutter member X by means of a pin member 41a which extends from that end of the connecting lever 41 and is slidingly engaged in the slot 11a while the other end of the connecting lever 41 is operatively connected to the shutter member Y by means of a similar pin member 41b which extends from that end of the connecting lever 41 and is slidingly engaged in the slot 21a in the second shutter member Y.

While the motors $M_1$ and $M_2$ are respectively operatively coupled to both of the first and second shutter members X and Y in the manner as hereinbefore described, it is to be noted that the connecting levers 40 and 41 so arranged as hereinbefore described extend in parallel relation to each other so that, when the drive shafts MSa and MSb are simultaneously rotated in the same directions, the first and second shutter members X and Y can undergo a relative parallel motion with respect to each other in the opposite directions.

While the first and second shutter members X and Y are so supported in the manner as hereinbefore described, the first and second shutter members can be selectively moved between their respective inoperative positions, in which the exposure aperture A is closed as shown in FIG. 1 with the openings 13 and 23 spaced from each other, and their respective operated positions in which the exposure aperture A is opened as shown in FIG. 3 with the openings 13 and 23 overlapping with each other in communication with said exposure aperture A. This is possible because rotation of one or both of the motors $M_1$ and $M_2$ and, therefore, the drive shafts MSa and MSb is transmitted to both of the first and second shutter members X and Y through the connecting levers 40 and 41. It is to be noted that, during the relative parallel movement of the first and second shutter members X and Y, the pin members 40a, 40b, 41a and 41b slidingly move within the guide slots 12a, 22a, and 11a and 21a, respectively, while they transmit the rotary motion of one or both of the drive shafts MSa and MSb to the shutter member X and Y in sliding contact with the associated arms 12, 22, 11 and 21.

Two pairs of arcuate grooves 42a, 42b and 43a, 43b are shown to be defined on the surface of the wall panel W opposed to its surface where the motors $M_1$ and $M_2$ are supported by the respective mounting flanges MFa and MFb. One of the pairs of arcuate grooves 42a and 42b are arranged in coaxial relation to the drive shaft MSa and positioned in substantially 180° spaced relation to each other along the path of movement of the pin members 40a and 40b, while the other of the pairs of arcuate grooves 43a and 43b are similarly arranged in coaxial relation to the drive shaft MSb and positioned in substantially 180° spaced relation to each other along the path of movement of the pin members 41a and 41b. These arcuate grooves 42a, 42b, 43a and 43b respectively receive therein free ends of the pin members 40a, 40b, 41a and 41b for defining the angle of rotation of the connecting levers 40 and 41 and, therefore, the stroke of movement of the first and second shutter members X and Y. For this purpose, the chord of the arch of each of the arcuate grooves 42a, 42b, 43a and 43b is so selected as to be substantially equal to the stroke of movement of the first and second shutter members X and Y between the inoperative positions and the operated positions. More specifically, the angular distance of any one of the grooves 42a, 42b, 43a and 43b of each pair is so selected that, when the first and second shutter members X and Y are held in the inoperative positions as shown in FIG. 1, the corresponding pin member carried by the associated connecting lever is engaged in one of the opposed ends of the groove while, when the shutter members X and Y are moved to the operated positions, the same pin member is engaged to the other of the opposed ends in the same groove. It is to be noted that, although the number of pairs of the arcuate grooves is shown to be two, either only one of the arcuate grooves 42a, 42b, 43a or 43b or only one pair of arcuate grooves 42a and 42b or 43a and 43b may suffice.

While the shutter mechanism is constructed as hereinbefore described, any one of the motors $M_1$ and $M_2$ is preferably of a type generally referred to as a "coreless D.C. motor", a recently developed and now commercially available version of D.C. motor which utilizes a magnet of either rare earth element or cobalt and has an armature winding without iron core. As compared with the standard D.C. motor, the coreless D.C. motor is compact in size, capable of giving a relatively high torque at the start of rotation thereof and durable against repeated operation thereof. In any event, the coreless D.C. motor is now commercially available and a specification thereof is also available from the manufacturer thereof and, therefore, reference may be made thereto.

Although in FIGS. 1 to 3, the motors $M_1$ and $M_2$ are shown to be of different size due to the fact that the motor $M_1$ has an armature winding greater in number of turns thereof than that of the armature winding in the motor $M_2$ so that the motor $M_1$ can give a higher torque at the start of rotation thereof than that given by the motor $M_2$, they may be of the same or different types. For example, one of the motors $M_1$ and $M_2$ which is of a type having an armature around which (1) only one armature winding is wrapped, (2) two armature windings, opposed in the direction of winding with respect to each other, are wrapped, or (3) two armature windings, opposed in the direction of winding with respect to each other and having a different number of turns or different wire size, may be employed in combination with the other of the motors $M_1$ and $M_2$ which is of a type having an armature around which (1) only one armature winding is wrapped, (2) two armature wndings, opposed in the direction of winding with respect to each other, are wrapped, or (3) two armature windings, opposed in the direction of winding with respect to each other and having a different number of turn or different wire size are wrapped.

Positioned to the left of the drive shaft MSa and supported by the wall panel W is an electromagnet 44 cooperative with a permanent magnet 45 which is rigidly secured to a lug 22b shown to be integrally formed with the free end of the arm 22. The electromagnet 44 is shown to be constituted by a metallic bar 44a around which a coil 44b is wound and is so designed that, when the second shutter member Y is to be moved from the inoperative position towards the operated position together with the first shutter member X, a direct current is allowed to flow through the coil 44b in one direction to develop a magnetic force of repulsion between one end of the bar 44a adjacent the magnet 45 and one end of the magnet 45 adjacent the bar 44a, with which force of repulsion the second shutter member Y can readily be moved towards the operated position upon rotation of one or both of the drive shafts MSa and MSb and, when the second shutter member Y, which has been moved towards the operated position and subsequently returned back towards the inoperative position accompanying the corresponding movement of the first shutter member X, current is allowed to flow through the coil 44b in the opposite direction to develop a magnetic force of attraction between the one end of the bar 44a and the one end of the magnet 45, with which force of attraction the shutter member Y can be firmly held in the inoperative position together with the first shutter member X without substantially allowing any arbitrary movement of one or both of the shutter members.

The electric drive circuits, each of which may be employed for operating the shutter mechanism of the construction shown in FIGS. 1 to 3, will now be described.

Figure 4:
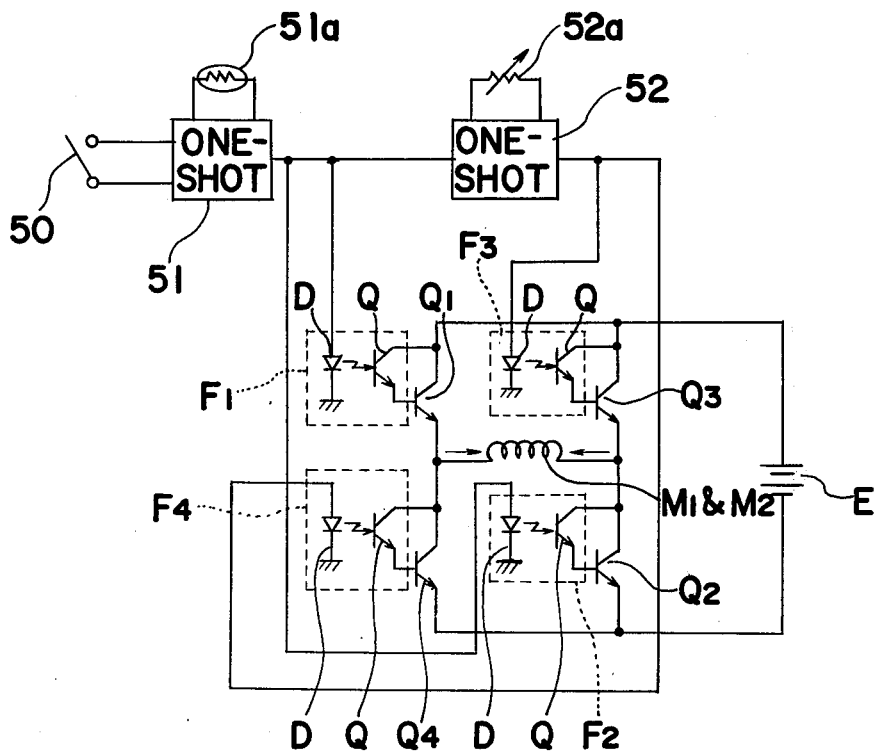
FIG. 4 is a schematic electric circuit diagram showing a drive circuit for operating electric motors employed in the shutter mechanism.
Figure 5:
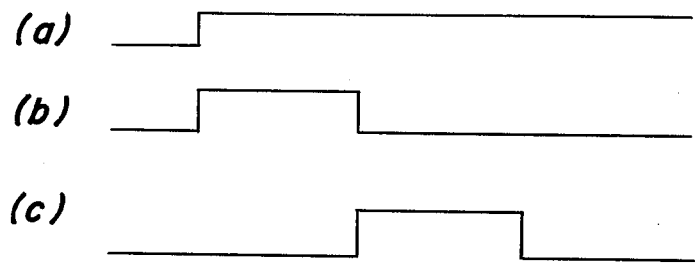
FIG. 5 is a chart showing various waveforms of electric signals appearing in the circuit of FIG. 4.

Referring first to FIGS. 4 and 5, the electric drive circuit shown basically comprises two drive channels and includes a release switch 50, which is normally opened, but is closed in response to depression of a shutter release button (not shown) provided in the camera housing, which depression is effected during actual taking of a photographic picture. Upon closure of the release switch 50, an electric signal indicative of the depression of the shutter release button, the wave-form of which is shown by (a) in FIG. 5, is applied to a first one-shot multivibrator 51 having a photocell 51a, such as a CdS cell, the resistance of which photocell 51a varies in proportion to the amount of light reflected onto such photocell from an object to be photographed. The one-shot multivibrator 51 generates an output pulse of a waveform shown by (b) in FIG. 5, the pulse duration of which is determined according to the amount of light received by the photocell 51a The output pulse from the one-shot multivibrator 51 is subsequently applied in part to a first photo-coupler $F_1$, composed of a light emitting diode D and a photo-transistor Q, to bring a first switching transistor $Q_1$ into a conductive state and in part to a second photo-coupler $F_2$, composed of a light emitting diode D and a photo-transistor $Q_2$, to bring a second switching transistor $Q_2$ into a conductive state. Simultaneous conduction of the first and second switching transistors $Q_1$ and $Q_2$ continues for a predetermined time determined by and equal to the pulse duration of the output pulse (b) from the one-shot multivibrator 51. During this conduction of the transistors $Q_1$ and $Q_2$, a current from a D.C. power source E flows from the positive terminal thereof towards the negative terminal thereof through the first switching transistor $Q_1$, then the motors $M_1$ and $M_2$, particularly the armature windings thereof, and finally the second switching transistor $Q_2$. Therefore, during the pulse duration of the output pulse (b) from the one-shot multivibrator 51, the motors $M_1$ and $M_2$ are simultaneously energized to rotate the respective drive shaft MSa and MSb in one direction thereby moving the first and second shutter members X and Y from the inoperative positions towards the operated positions in the manner as hereinbefore described.

On the other hand, the output pulse (b) from the one-shot multivibrator 51 is applied to a second one-shot multivibrator 52 so designed as to generate an output pulse of a waveform shown by (c) in FIG. 5 in response to termination of the pulse duration of the output pulse (b) from the first one-shot multivibrator 51. The second one-shot multivibrator 52 includes a variable resistor 52a, whose resistance is preset determine the pulse duration of the output pulse (c) emerging from such one-shot multivibrator 52. This output pulse (c) from the multivibrator 52 is applied in part to a third photo-coupler $F_3$, composed of a light emitting diode D and a photo-transistor Q, to bring a third switching transistor $Q_3$ into a conductive state and in part to a fourth photo-coupler $F_4$, composed of a light emitting diode D and a photo-transistor Q, to bring a fourth switching transistor Q into a conductive state. It is to be noted that, since simultaneous conduction of the third and fourth transistors $Q_3$ and $Q_4$ takes place subsequent to the extinguishment of the output pulse (b) from the first one-shot multivibrator 51, as is readily understood from the comparison of the waveforms (b) and (c) in FIG. 5, the first and second switching transistors $Q_1$ and $Q_2$ are brought into a non-conductive state at the time the third and fourth switching transistors $Q_3$ and $Q_4$ are so brought into the conductive state.

During the conduction of the transistors $Q_3$ and $Q_4$ so effected, the current from the D.C. power source E flows from the positive terminal thereof towards the negative terminal thereof through the third switching transistor $Q_3$, then the motors $M_1$ and $M_2$ and finally the fourth switching transistor $Q_4$. It is, however, to be noted that the direction of flow of the current through the armature windings of the motors $M_1$ and $M_2$ during the conduction of the third and fourth switching transistors $Q_3$ and $Q_4$ is exactly opposed to that during the conduction of the first and second switching transistors $Q_1$ and $Q_2$. Therefore, the motors $M_1$ and $M_2$ are energized to rotate their respective drive shafts MSa and MSb in the opposite direction, thereby moving the first and second shutter members X and Y, which have previously been moved towards the operated positions, back towards the inoperative positions.

From the foregoing, it will readily be seen that the lower the resistance of the photocell, 51a, that is, the brighter the object to be photographed, the smaller the time during which the openings 13 and 23 in the respective shutter members X and Y allow the passage therethrough of the incoming light from the exposure aperture towards the light sensitive film. Conversely, the higher the resistance of the photocell 51a, that is, the darker the object to be photographed, the longer the time during which the openings 13 and 23 in the shutter members X and Y allow the passage therethrough of the incoming light from the exposure aperture A towards the light sensitive film.

The drive circuit which has been described with reference to FIGS. 4 and 5 is such that both of the motors $M_1$ and $M_2$ are simultaneously energized for alternately moving the shutter members X and Y from the inoperative positions towards the operated positions and from the operated positions towards the inoperative positions. However, alternate energization of the motors $M_1$ and $M_2$ may be employed and, for this purpose, there is provided an alternative drive circuit as shown in FIG. 6.

Figure 6:
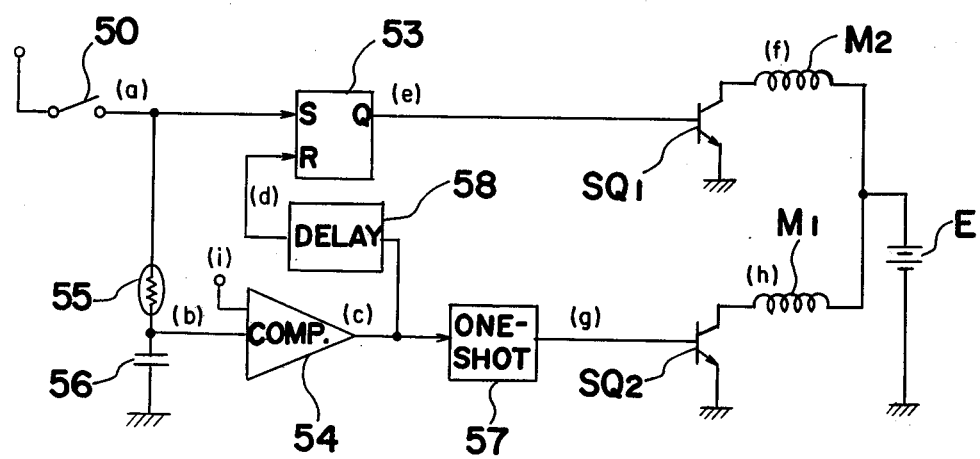
FIG. 6 is a schematic block diagram showing another form of drive circuit for operating the motors employed in the shutter mechanism.
Figure 7:
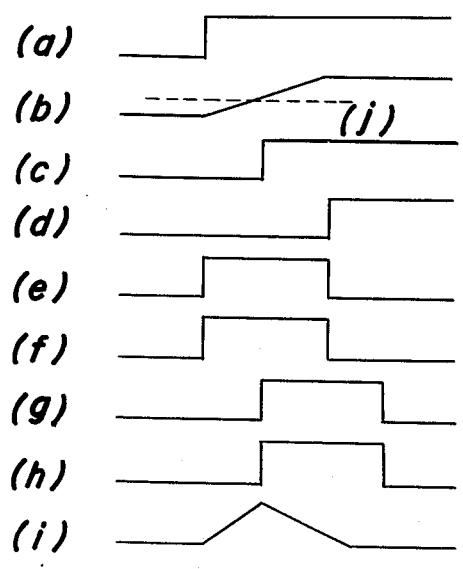
FIG. 7 is a chart showing various waveforms of electric signals appearing in the circuit of FIG. 6.

Referring to FIG. 6, the drive circuit shown includes a shutter release switch 50 so associated with the shutter release button in the camera housing that, upon depression of the release button, the switch 50 is closed to allow passage therethrough of an electric signal of a waveform shown by (a) in FIG. 7 in part towards a set terminal of a flip-flop circuit 53 and in part towards a comparison circuit 54 through a circuit unit composed of a photocell 55, such as a CdS cell, and a capacitor 56. Upon application of the electric signal (a) to the set terminal of the flip-flop circuit 53, the latter is set to generate an output pulse (c) with which a switching transistor $SQ_1$ of NPN type is brought into a conductive state. Conduction of the switching transistor $SQ_1$ allows the current (f) from the D.C. power source E to flow from the positive terminal back towards the negative terminal thereof through the motor $M_2$ and then the switching transistor $SQ_1$, thereby energizing the motor $M_2$.

Upon energization of the motor $M_2$, the drive shaft MSb is rotated counterclockwise, as viewed in FIGS. 1 and 3, to move the first and second shutter members X and Y from the inoperative position towards the operated position, thereby opening the exposure aperture A.

The comparison circuit 54 has a pair of input terminals, one input terminal being connected to a reference signal generator (not shown) from which a reference signal of a predetermined voltage as shown by (j) in FIG. 7 is applied thereto and the other input terminal being connected to the circuit unit, composed of the photocell 55 and the capacitor 56, from which an electric signal of a waveform as shown by (b) in FIG. 7 is applied thereto. This comparison circuit 54 generates an output signal only when the voltage of the electric signal applied thereto through the circuit unit composed of the photocell and the capacitor exceeds the predetermined voltage (j) of the reference signal applied thereto from the reference signal generator, which output signal from the comparison circuit 54 has a waveform shown by (c) in FIG. 7. This output signal from the comparison circuit 54 is then applied in part to a one-shot multivibrator 57 and in part to a reset terminal of the flip-flop circuit 53 through a delay circuit 58.

The one-shot multivibrator 57, upon receipt of the output signal from the comparison circuit 54, generates a pulse of a waveform as shown by (g) in FIG. 7 to a second switching transistor $SQ_2$ of NPN type so that the latter can be brought into a conductive state. Upon conduction of the transistor $SQ_2$, the current from the D.C. power source E flows through the armature coil of the motor $M_1$ and then the switching transistor $SQ_2$, thereby energizing the motor $M_1$. It is to be noted that, at the time the motor $M_1$ is energized, the motor $M_2$ which has been energized earlier than the motor $M_1$ is still energized. Deenergization of the motor $M_2$ takes place when a reset signal, which is the output signal from the comparison circuit 54 delayed a predetermined time by the delay circuit 58 as shown by (d) in FIG. 7, is applied to the reset terminal of the flip-flop circuit 53.

In the circuit shown in FIG. 6, it is clear that the period during which the motor $M_2$, as represented by (f) in FIG. 7 in the form of the current flowing through the switching transistor $SQ_1$ during the conduction of the latter is energized partially overlap the period during which the motor $M_1$, as represented by (h) in FIG. 7 in the form of the current flowing through the switching transistor $SQ_2$ during the conduction of the latter is energized. This will now be described with particular reference to FIG. 7.

As is well known to those skilled in the art, the circuit unit composed of the photocell 55 and the capacitor 56 serves to determine the gradient of increase of the voltage to be fed to the comparison circuit 54. Specifically, the lower the resistance of the photocell 55 with a relatively high intensity of light received by such photocell 55, the greater the gradient of increase of the voltage to be applied to the comparison circuit 54. Therefore, if the gradient of increase of the voltage to be applied to the comparison circuit 54 is relatively great, the voltage fed from the circuit unit exceeds the reference voltage, applied to the comparison circuit 54 from the reference signal generator, in a relatively short period of time and, therefore, the motor $M_1$ is energized earlier than in the case where the resistance of the photocell 55 is relatively high. This means that, before complete travel of the shutter members X and Y from the inoperative positions towards the operated positions effected by the counterclockwise rotation of the drive shaft MSb, the motor $M_1$ is energized to rotate the drive shaft MSa clockwise, as viewed in FIGS. 1 and 3, thereby imparting a braking force to the movement of the shutter members X and Y. At this time, the openings 13 and 23 in the shutter members X and Y partially overlap with each other in communication with the exposure aperture A, the extent to which these openings 13 and 23 overlap with each other being determined by the time span between the time at which the motor $M_2$ is energized and the time at which the motor $M_1$ is energized.

Thereafter, upon deenergization of the motor $M_2$ incident to termination of the output from the flip-flop circuit 53, which takes place the predetermined time delayed after energization of the motor $M_1$, the shutter members X and Y are returned back towards their respective inoperative positions by the effect of the clockwise rotation of the drive shaft MSa.

On the contrary thereto, where the resistance of the photocell 55 is relatively high with a relatively low intensity of light received by said photocell 55, the gradient of increase of the voltage to be applied to the comparison circuit 54 is so relatively small that a relatively long time is required for the voltage from the circuit unit to attain the reference voltage in the comparison circuit 54. Therefore, it will readily be seen that energization of the motor $M_1$ subsequent to the energization of the motor $M_2$ may take place after the shutter members X and Y have been moved to their operated positions in which case the openings 13 and 23 may fully overlap with each other in communication with the exposure aperture A.

The waveform (i) shown in FIG. 7 illustrates the operation of the shutter mechanism in timed relation to various waveforms of the electric signals appearing in the circuit of FIG. 6. In the waveform (i) of FIG. 7, the height of the peak from the base line represents the extent to which the openings 13 and 23 overlap with each other in communication with the exposure aperture A and, therefore, it will readily be seen that, if the voltage from the circuit unit attains the reference voltage in the comparison circuit 54 earlier than that shown by the waveform (c), the height of the peak from the base line is lower than that shown in the waveform (i). This means that the extent to which the openings 13 and 23 overlap with each other, that is, the opening of the shutter mechanism according to the present invention, is smaller than that represented by the waveform (i). It is, however, to be noted that the linear velocity of movement of the shutter members X and Y remains the same irrespective of the size of the opening of the shutter mechanism.

Where the deenergization of the motor $M_2$ is desired to be effected incident to the energization of the motor $M_1$, the delay circuit 58 may be omitted and the comparison circuit 54 may be connected to the reset terminal of the flip-flop circuit 53.

While the circuit shown and described with reference to FIGS. 6 and 7 is so designed that the motors $M_2$ and $M_1$ are alternately energized to open and close the shutter mechanism, it is possible to utilize such a drive circuit that motors $M_2$ and $M_1$ are simultaneously energized by a current flowing in one direction during opening of the shutter mechanism and by a current flowing in the opposite direction during closure of the shutter mechanism. This will now be described with particular reference to FIGS. 8 and 9. It is, however, to be noted that the drive circuit of FIG. 8 is a push-pull circuit based on the circuit of FIG. 6.

Figure 8:
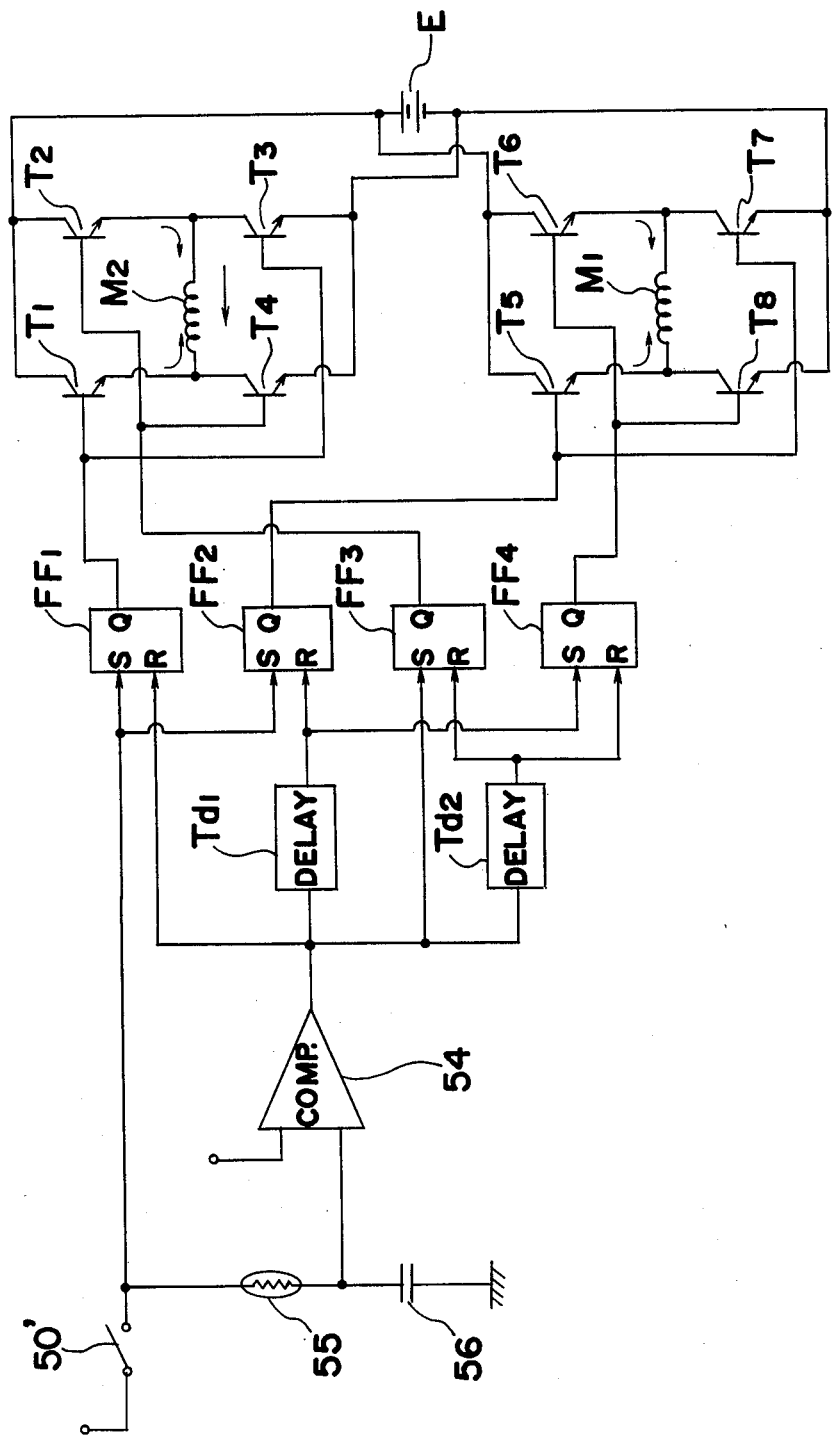
FIG. 8 is a schematic block diagram showing a further form of drive circuit for operating the motors employed in the shutter mechanism.
Figure 9:
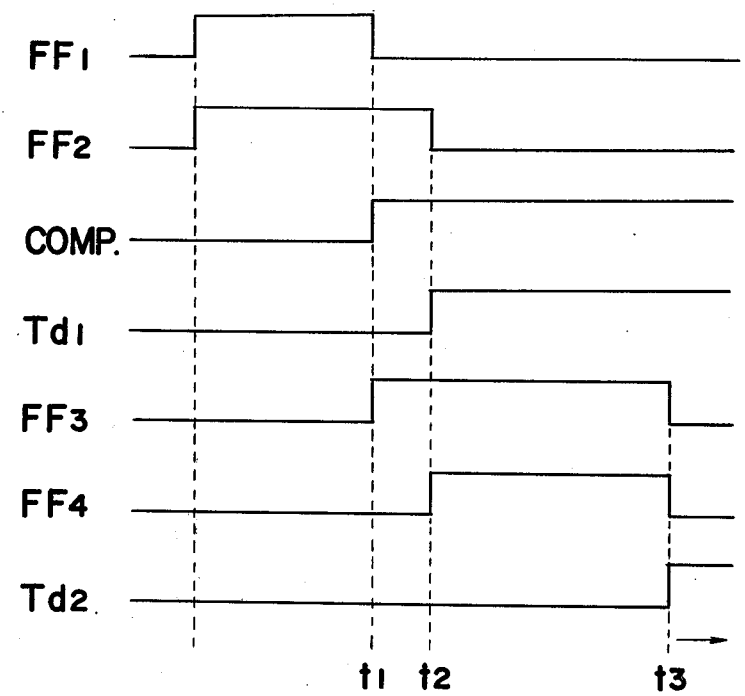
FIG. 9 is a chart showing various waveforms of electric signals appearing in the circuit of FIG. 8.

Referring now to FIGS. 8 and 9, the push-pull circuit comprises two similar circuit units which operate in opposite relationship to each other; one circuit unit including first and second flip-flops $FF_1$ and $FF_2$ and a first delay circuit $Td_1$ and the other circuit unit including third and fourth flip-flops $FF_3$ and $FF_4$ and a second delay circuit $Td_2$.

The first flip-flop $FF_1$ has a set terminal so connected to the release switch 50' that, upon closure of the shutter release switch 50', that is, in response to depression of the shutter release button in the camera housing, the first flip-flop $FF_1$ generates from its output terminal a trigger pulse of a duration determined by the output signal to be applied from the comparison circuit 54 to a reset terminal of said flip-flop $FF_1$. The trigger pulse from the flip-flop $FF_1$ is applied in part to a switching transistor $T_1$ of NPN type and in part to a switching transistor $T_3$ of NPN type, causing these transistors $T_1$ and $T_3$ to become conductive. Conduction of these transistors $T_1$ and $T_3$ results in energization of the motor $M_2$ with the current from the D.C. power source E flowing through the transistor $T_1$, then the armature winding of the motor $M_2$ and finally the transistor $T_3$.

Simultaneously therewith, since the second flip-flop $FF_2$ also has a set terminal connected to the switch 50' and a reset terminal connected to the comparison circuit 54 through the first delay circuit $Td_1$, the flip-flop $FF_2$ also generates a trigger pulse which is in turn applied in part to a switching transistor $T_5$ of NPN type and in part to a switching transistor $T_7$ of NPN type, causing these transistors $T_5$ and $T_7$ to become conductive. Conduction of these transistors $T_5$ and $T_7$ results in energization of the motor $M_1$ with the current from the power source E flowing through the transistor $T_5$, then the armature winding of the motor $M_1$ and finally the transistor $T_7$.

Therefore, it is clear that the shutter members X and Y are moved from the inoperative positions towards the operated positions in a manner similar to that described in connection with the circuit with reference to FIGS. 4 and 5. However, it is to be noted that, because of the delay circuit $Td_1$ inserted between the comparison circuit 54 and the reset terminal of the second flip-flop $FF_2$, the duration of the trigger pulse emerging from the flip-flop $FF_2$ is, as shown in FIG. 9, longer than that of the trigger pulse from the first flip-flop $FF_1$, said duration of the trigger pulse from said flip-flop $FF_2$ being substantially equal to the sum of the time required for the voltage charged on the capacitor 56 to attain the reference voltage in the comparison circuit 54 plus the delay time $(t_2 - t_1)$ set in the delay circuit $Td_1$.

On the other hand, the third flip-flop $FF_3$ is, in response to the output signal applied from the comparison circuit 54 to a set terminal thereof, set to generate a trigger pulse simultaneously with the reset of the flip-flop $FF_1$, that is, when the voltage charged on the capacitor 56 attains the reference voltage in the comparison circuit 54. The reset of the flip-flop $FF_1$ results in deenergization of the motor $M_2$ with the transistors $T_1$ and $T_3$ switched off on one hand and the trigger pulse from the flip-flop $FF_3$ causes switching transistors $T_2$ and $T_4$ of NPN type to become conductive on the other hand. Upon conduction of the transistors $T_2$ and $T_4$, the motor $M_2$ is again energized. However, the current from the power source E flows through the armature winding of the motor $M_2$ in a direction opposite to the direction of flow therethrough of the same current during the conduction of the transistors $T_1$ and $T_3$ and prior to the conduction of the transistors $T_2$ and $T_4$. Therefore, the drive shaft MSb is so reversed that the shutter members X and Y then being moved towards the operated positions are forced to return back towards the inoperative positions, the actual return movement of said shutter members X and Y being taken place incident to reset of the flip-flop $FF_2$ as will now be described. Accordingly, the continued movement of the shutter members X and Y towards the respective operated positions is substantially braked. This may take place either when the openings 13 and 23 partially overlap with each other or when they wholly overlap with each other, depending upon the resistance of the photocell 55, which resistance varies in proportion to the amount of light reflected onto said photocell 55 from the object to be photographed.

The flip-flop $FF_2$ is reset to bring the transistors $T_5$ and $T_7$ into a non-conductive state when the output signal from the comparison circuit 54 is, after having been delayed the predetermined time $(t_2-t_1)$ by the delay circuit $Td_1$, applied to the reset terminal of said flip-flop $FF_2$. The delayed output signal from the comparison circuit 54 through the delay circuit $Td_1$ is also applied to a set terminal of the fourth flip-flop $FF_4$ and, therefore, simultaneously with the switch-off of the transistors $T_5$ and $T_7$, the transistors $T_6$ and $T_8$ are brought into a conductive state. Consequently, the current flows through the armature winding of the motor $M_1$ in a direction opposite to the direction thereof during the conduction of the transistors $T_5$ and $T_7$ and prior to the conduction of the transistors $T_6$ and $T_8$. Accordingly, the shutter members X and Y which have been braked as hereinbefore described are returned back towards the inoperative positions with the shutter mechanism closed.

The output signal from the comparison circuit 54 is also, after having been delayed by the delay circuit $Td_2$, applied to the respective reset terminals of the flip-flops $FF_3$ and $FF_4$ to bring the circuit of FIG. 8 into the original, inoperative position in which both of the motors $M_1$ and $M_2$ are deenergized for the subsequent operation. However, the time during which the output signal from the comparison circuit 54 is delayed by the delay circuit $Td_2$, that is, the difference $(t_3-t_1)$, is preferably so determined as to be equal to or slightly larger than the sum of the delay time, set in the delay circuit $Td_1$, and the time required for any one of the shutter members X and Y to complete its movement between the inoperative position and the operated position.

Where the motor $M_1$ and $M_2$ are of the same construction and each of the type having an armature around which only one armature coils is wrapped, the circuit shown in FIG. 4 is recommended for use with the shutter mechanism according to the present invention. On the other hand, where the motors $M_1$ and $M_2$ are of the same construction and each of the type having an armature around which two armature windings, opposed in the direction of winding with respect to each other, are wrapped or two armature windings, opposed in the direction of winding with respect to each other and having a different number of turns or different wire size, are wrapped, any of the circuits of FIGS. 6 and 8 is recommended.

In particular, where the motor $M_1$ and $M_2$ of the type having the two armature windings opposed in the direction of winding with respect to each other and having a different number of turns or different wire size are employed in the shutter mechanism in association with any one of the circuit of FIGS. 6 and 8, the triggering pulse ultimately used to move the shutter members X and Y from the inoperative positions towards the operated positions, such as represented by the waveform (f) in FIG. 7 or $FF_2$ in FIG. 9, is preferred to be applied to either one of the motors $M_1$ and $M_2$ of the type wherein the number of turns of or the wire size of the armature winding is greater than that in the other of the motors $M_1$ and $M_2$.

Moreover, in the case where the motors $M_1$ and $M_2$ have the same j performance characteristics, a resistance element (not shown) may be inserted in an electric circuit associated with the motor $M_2$ so that the motor $M_2$ can give a substantially higher torque than that given by the motor $M_1$.

In FIGS. 1 to 3, the shutter mechanism has been described as employing the two motors $M_1$ and $M_2$. However, only one motor $M_1$ or $M_2$ may suffice. In other words, even if either one of the motors $M_1$ and $M_2$ is omitted, the shutter mechanism shown in FIGS. 1 to 3 functions satisfactorily and effectively. However, where only one motor is employed, the shutter mechanism may preferably be constructed such as shown in FIG. 10.

Figure 10:
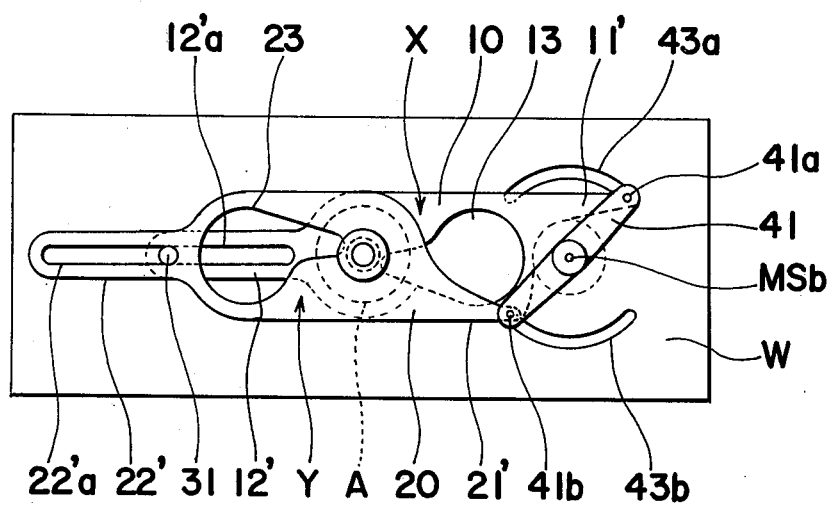
FIG. 10 is a view similar to FIG. 1, showing another preferred embodiment of the present invention wherein only one electric reversible motor is employed.

Referring now to FIG. 10, the first shutter member X comprises a first shutter plate 10 having one end formed with a slotted arm 12' and the other end formed with a finger 11' pivotally connected to the connecting lever 41 through the pin member 41a. This first shutter member X is supported by the mounting pin member 31 extending through a slot 12'a defined in the arm 12' while the finger 11' is pivotally connected to the connecting lever 41.

On the other hand, the second shutter member Y comprises a second shutter plate 20 having one end formed with a slotted arm 22', mounted on the pin member 31 extending through a slot 22'a defined in said arm 22', and the other end formed with a finger 21' pivotally connected to the connecting lever 41 through the pin member 41b.

The arrangement shown in FIG. 10 is such that, starting from the condition shown in FIG. 10, when the motor is driven to rotate its drive shaft MSb in a counterclockwise direction, the first and second shutter members X and Y are moved from the inoperative positions as shown towards the operated positions while simultaneously pivoting in the opposite directions about the mounting pin member 31. On the other hand, when the motor is driven to rotate its drive shaft MSb in the opposite, clockwise direction, the first and second shutter members X and Y which have been moved to the operated positions are returned back to the original inoperative positions while they undergo a relative pivotal movement in the opposite direction about the pin member 31.

Although the present invention has fully been described in connection with the preferred embodiments thereof, it is to be noted that various changes and modifications are apparent to those skilled in the art. For example, depending upon the purpose for which the shutter mechanism embodying the concept of the present invention is utilized, the openings 13 and 23, which have been described as defined in the first and second shutter members X and Y, respectively, may not be always necessary. In this case, the exposure aperture A may be opened when the shutter plates 10 and 20 are brought into respective positions clear of the exposure aperture A and closed when the shutter plates 10 and 20 overlap with each other. The number of the shutter members may not be always limited to two such as shown and described, but one shutter member may constitute the shutter mechanism according to the present invention.

Where the shutter mechanism includes the only shutter member adapted to selectively open and close the exposure aperture, only one motor suffices.

In addition, instead of the D.C. motors $M_1$ and $M_2$, A.C. motors may be employed depending upon the purpose for which the shutter mechanism according to the present invention is utilized, for example, in the business machine such as a copying machine.

Accordingly, such changes and modifications are to be understood as included within the true scope of the present invention unless they depart therefrom.

What we claim:

1. A shutter mechanism for selectively opening and closing an exposure aperture through which, during opening of the exposure aperture, the incoming light is allowed to pass therethrough, which comprises in combination:

first and second shutter members supported in position in substantially overlapping relation to each other for movement between their respective inoperative positions, in which said exposure aperture is closed, and their respective operated positions in which said exposure aperture is opened, in opposite directions with respect to each other;

means for supporting said first and second shutter members and for guiding the relative movement of said first and second shutter members;

first and second electric motors having respective drive shafts operatively coupled to said first and second shutter members, respectively;

linkage means interconnecting said first shutter member to said second shutter member for transmitting the movement of each shutter member to the other shutter member;

first electric circuit means for applying an opening pulse to said first motor to rotate its drive shaft in one direction and move said shutter members to their operated positions; and second electric circuit means for applying a closing pulse to said second motor to rotate its drive shaft in the opposite direction and return said shutter members, which have been moved towards their operated positions, towards their inoperative positions.

2. The shutter mechanism as claimed in claim 1, wherein said motors are a coreless D.C. motors.

3. The shutter mechanism as claimed in claim 1, wherein said first circuit means comprises means for also applying the opening pulse to said second motor to rotate its drive shaft in said one direction to move said shutter members to their operated positions, and wherein said second circuit means comprises means for also applying the closing pulse to said first motor to rotate its drive shaft in said opposite direction to move said shutter members to their inoperative positions.

4. The shutter mechanism as claimed in claim 3, wherein said motors are reversible D.C. motors.

5. The shutter mechanism as claimed in claim 1, further comprising third circuit means for causing the duration of the opening pulse to partially overlap with the duration of the closing pulse, thereby to impart a braking effect to the movement of the shutter members towards their operated positions.

6. The shutter mechanism as claimed in claim 5, wherein said third circuit means comprises light-responsive means, responsive to the intensity of said incoming light, for varying the time between the applications of the opening and closing pulses; the greater the intensity, the shorter the time.

7. The shutter mechanism as claimed in claim 6, further including a normally open shutter release switch, and wherein said first circuit means comprises a flip-flop circuit which is set by the closing of said switch to initiate said opening pulse, wherein said second circuit means comprises a one-shot multivibrator coupled to said light responsive means for initiating said closing pulse at a time subsequent to the initiation of said opening pulse, and wherein said third circuit means comprises fixed delay means coupled between said light responsive means and said flip-flop circuit to reset said flip-flop circuit to terminate said opening pulse at a time subsequent to the initiation of said closing pulse but prior to the termination thereof.

* * * * *